United States Patent
Yamaguchi

[11] 4,214,816
[45] Jul. 29, 1980

[54] HIGH SPEED TELEPHOTO LENS SYSTEM

[75] Inventor: Tamikazu Yamaguchi, Sakai, Japan

[73] Assignee: Minolta Camera Kabushiki Kaisha, Osaka, Japan

[21] Appl. No.: 944,373

[22] Filed: Sep. 21, 1978

[30] Foreign Application Priority Data

Sep. 27, 1977 [JP] Japan ................... 52/116497

[51] Int. Cl.² ............................................. G02B 13/02
[52] U.S. Cl. .................................................. 350/218
[58] Field of Search ......................................... 350/218

[56] References Cited

U.S. PATENT DOCUMENTS

| | | | |
|---|---|---|---|
| 2,363,712 | 11/1944 | Warmisham et al. | 350/218 |
| 3,749,478 | 7/1973 | Nakagawa | 350/216 |
| 3,761,161 | 9/1973 | Nakagawa | 350/218 |

*Primary Examiner*—Conrad J. Clark
*Attorney, Agent, or Firm*—Jackson, Jones & Price

[57] ABSTRACT

An improved compact high speed telephoto lens system of a modified Ernostar type is provided, having from the object to the image side of the lens system, a first lens of a positive meniscus shape, convex to the object side; a second lens of a positive meniscus shape, convex to the object side; a third lens of a negative meniscus shape, convex to the object side; a fourth lens of a negative meniscus shape, convex to the object side; and a fifth lens of a positive refractive power. The fourth lens can be a doublet in an alternative embodiment. A positive Petzval sum is provided to insure an appropriate field curvature while permitting the refractive index of the positive lenses to be sufficiently high to correct coma and astigmatism.

7 Claims, 6 Drawing Figures

Spherical Aberration

Astigmatism

Distortion

Spherical Aberration

Astigmatism

Distortion

Spherical Aberration

Astigmatism

Distortion

Spherical Aberration

Astigmatism

Distortion

HIGH SPEED TELEPHOTO LENS SYSTEM

BACKGROUND OF THE INVENTION

1. Field of the Invention

The present invention relates to a telephoto lens system, and more particularly to an improved relatively compact telephoto lens system having an aperture ratio of about 1/2.8 or higher, and a field angle of about 18 degrees.

2. Description of the Prior Art

A typical lens system in the field of telephoto lens systems is the Ernostar type lens system which consists from the object to the image side of a first positive, a second positive, a third negative and a fourth positive lens. These lens systems are designed to provide a relatively large aperture with a long focal length.

It has been recently disclosed in Japanese patent applications laid open to public inspection under No. 49-53421 and No. 51-62037, that a telephoto lens system having an aperture ratio of about 1/2.8 and a field angle of about 18 degrees is obtainable by forming the lenses of an Ernostar type lens system into a plurality of meniscus single lenses of relatively large thickness. However a 4 group, 4 component Ernostar type lens system according to the above publications, however, will have problems with field curvature, astigmatism and coma that will be difficult to correct if the lens system is also designed to be of a compact size. Thus, the telephoto ratio of such lens systems can only reach 0.97 at minimum.

U.S. Pat. No. 3,749,478 is cited for the disclosure of a telephoto lens system having five lenses. This patent discloses a modified Ernostar type lens system having a doublet or composite lens as its second lens and actually formed by separating the doublet into two lenses and by modifying the powers of the two lenses so that the two lenses each have a positive power. Thus, the modified lens system consists of a first positive, a second positive, a third positive, a fourth negative and a fifth positive lense.

The prior art is still seeking to provide compact lens systems having improved performance characteristics.

SUMMARY OF THE INVENTION

An object of the present invention is to provide a high speed telephoto lens system of a compact size wherein the telephoto ratio can be about 0.92.

Another object of the present invention is to provide a compact telephoto lens system having an aperture ratio of about 1/2.8 or higher and a field angle of about 18 degrees.

A further object of the present invention is to provide a compact telephoto lens system with various aberrations well corrected.

According to the present invention, the third negative lens in the conventional Ernostar type lens system is divided into two negative lenses to form a lens system which comprises a first positive, a second positive, a third negative, a fourth negative and a fifth positive lense, the first to fourth lenses each being a meniscus lens. Further, the third negative lens is located relatively close to the second positive lens, and it should be noted that the refractive power of the airspace formed between the second and third lenses is negative.

The lens system can further fulfill the following conditions:

$$0.2 < D_B/D_A < 0.45 \quad (1)$$

$$-0.8/f < 1.0 - N_A/R_A + N_B - 1.0/R_B < -0.1/f \quad (2)$$

$$N_C < 1.7 \quad (3)$$

$$0.3 < \nu_B - \nu_A < 4 \quad (4)$$

$$\nu_B < 32 \quad (5)$$

$$-0.5f < R_C < -0.3f \quad (6)$$

wherein;

$D_A$ represents a sum of the axial distances from the object side surface of the first lens to the image side surface of the fourth lens;

$D_B$ represents a sum of the axial distances from the image side surface of the third lens to the image side surface of the fourth lens;

$R_A$ represents a radius of curvature of the image side surface of the second lens;

$R_B$ represents a radius of curvature of the object side surface of the third lens;

$N_A$ represents a refractive index of a glass material forming the image side surface of the second lens;

$N_B$ represents a refractive index of a glass material forming the object side surface of the third lens;

$N_C$ represents a refractive index of a glass material forming the image side surface of fourth lens;

f represents the focal length of the whole lens system.

$\nu_A$ represents an Abbe number of the positive single lens element in the doublet;

$\nu_B$ represents an Abbe number of the negative single lens element in the doublet; and $R_C$ represents a radius of curvature of the cementing surface in the doublet.

The conditions (4), (5) and (6) being applicable only if an alternative embodiment of the invention with a doublet is used for the fourth lens The features of the present invention which are believed to be novel are set forth with particularity in the appended claims. The present invention, both as to its organization and manner of operation, together with further objects and advantages thereof, may be best understood by reference to the following description, taken in conjunction with the accompanying drawings.

BRIEF DESCRIPTION OF THE PREFERRED EMBODIMENTS

The following description is provided to enable any person skilled in the optical art to make and use the invention and sets forth the best modes contemplated by the inventor of carrying out his invention. Various modifications, however, will remain readily apparent to those skilled in the art, since the generic principles of the present invention have been defined herein specifically to provide a compact high speed telephoto lens system that can be manufactured in a relatively economical manner.

The derivation of the formulae and their relation set forth can be accomplished with the assistance of a computer. The present invention represents the parameters of a compromised balance of acceptable aberrations in a relatively easily manufactured and compact lens system for utilization, for example, with a single lens reflex camera.

Figure 1:
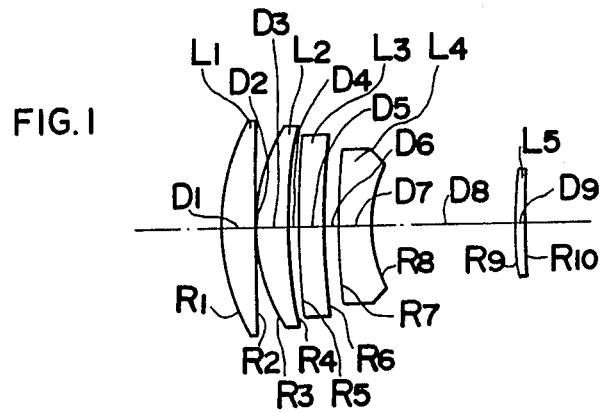
FIG. 1 represents a schematic cross sectional view showing the general lens construction of the first and second embodiments of the present invention.
Figure 2:
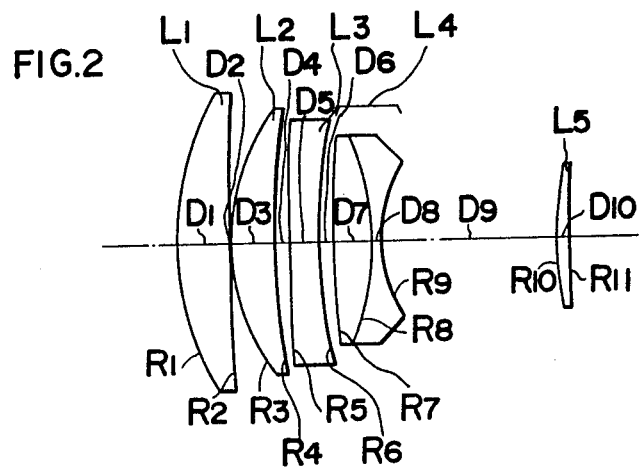
FIG. 2 represents a schematic cross sectional view showing the general lens construction of the third and fourth embodiments of the present invention.
Figure 3A:
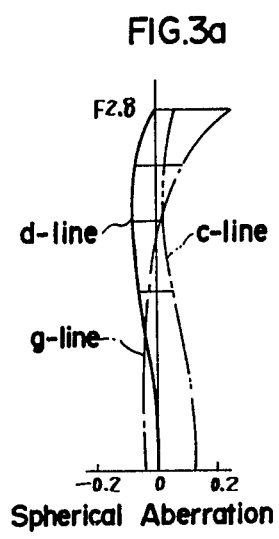
FIGS. 3 through 6 represent various aberration diagrams of the first to fourth embodiments, respectively.
Figure 3B:
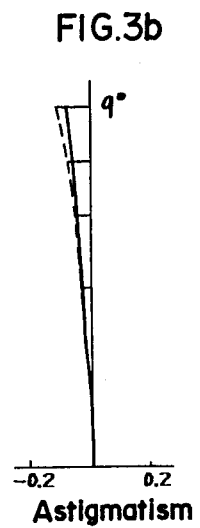
Figure 3C:
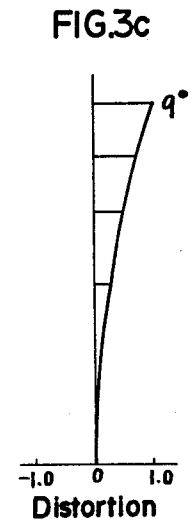
Figure 4A:
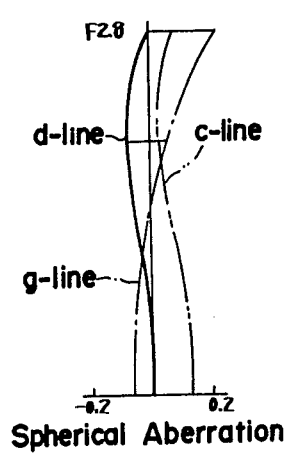
Figure 4B:
Figure 4C:
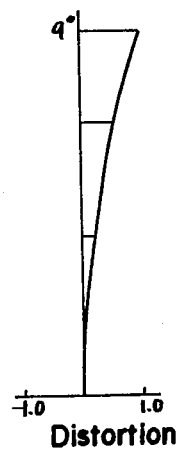
Figure 5A:
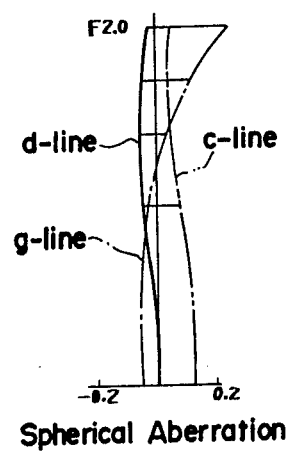
Figure 5B:
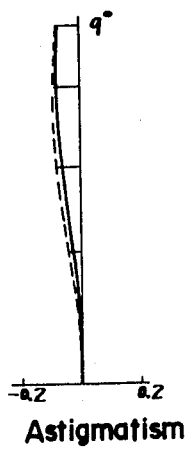
Figure 5C:
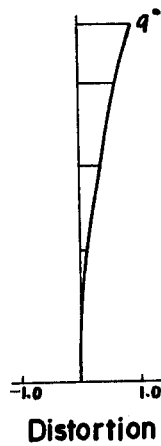
Figure 6A:
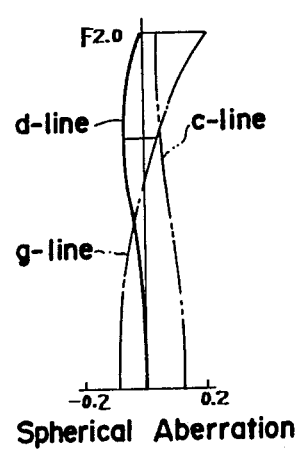
Figure 6B:
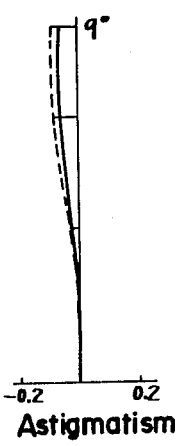
Figure 6C:
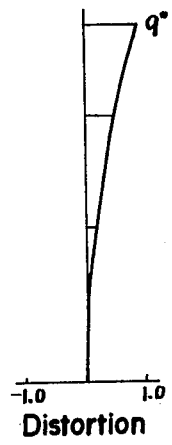

As shown in FIGS. 1 and 2, the compact high speed telephoto lens system of the present invention comprises from the object to the image side a first lens $L_1$ of a positive meniscus shape, convex to the object side; a second lens $L_2$ of a positive meniscus shape, convex to the object side; a third lens $L_3$ of a negative meniscus shape, convex to the object side; a fourth lens $L_4$ of a negative meniscus shape, convex to the object side, and a fifth lens $L_5$ of a positive refractive power.

The particular selection of these component lens configurations permits a compact high speed telephoto lens to satisfy the demand of the consumers for smaller high quality lenses.

The lens system further fulfills the following design conditions:

$$0.2 < D_B/D_A < 0.45 \tag{1}$$

$$-0.8/f < 1.0\text{-}N_A/R_A + N_B\text{-}1.0/R_B < -0.1/f \tag{2}$$

$$N_C > 1.7 \tag{3}$$

wherein;

$D_A$ represents a sum of axial distances from the object side surface of the first lens $L_1$ to the image side surface of the fourth lens $L_4$;

$D_B$ represents a sum of axial distances from the image side surface of the third lens $L_3$ to the image side surface of the fourth lens $L_4$;

$R_A$ represents a radius of curvature of the image side surface $R_4$ of the second lens $L_2$;

$R_B$ represents a radius of curvature of the object side surface $R_5$ of the third lens $L_3$;

$N_A$ represents a refractive index of a glass material forming the image side surface $R_4$ of the second lens $L_2$; p1 $N_B$ represents a refractive index of a glass material forming the object side surface $R_5$ of the third lens $L_3$;

$N_C$ represents a refractive index of a glass material forming the image side surface of fourth lens $L_4$; and f represents the focal length of the whole lens system.

If a conventional Ernostar type lens system is designed to be of a compact size, there are generally disadvantages in that the field curvature changes for the worse because of the negative value of the Petzval Sum and additionally the coma and astigmatism increase. If the above mentioned field curvature problem is desired to be improved, it is necessary to relatively decrease the refractive index for the positive lenses or to relatively increase the refractive index for the negative lenses to achieve a suitable positive Petsval Sum. The adoption of this refractive index change, however, is unfavorable to the correction of coma and astigmatism. Thus, it is very difficult to both improve field curvature and also correct coma and astigmatism in a conventional Ernostar lens system. Thus, one of the most important features of the present invention is the ability to overcome the above discussed difficulties by introducing the following two design concepts to obtain a high performance telephoto lens system with a compact size. These design choices include;

(a) to divide the third negative lens of the conventional Ernostar type lens system, which represents the only negative refractive power in the lens system, into two negative lenses and to locate the object side one suitably close to the object side second positive lens for providing a suitable positive Petzval Sum to improve the field curvature with the refractive index for the positive lenses still maintained sufficiently high to correct both coma and astigmatism; and (b) to make the refractive power of the airspace formed between the second and third lenses negative.

The above condition (1) wherein the position of the third lens $L_3$ relative to the first through the fourth lenses is defined, relates to the above concept (a). If the upper limit of condition (1) is violated, it may be impossible to make the refractive power of the third lens $L_3$ negative while providing a compact lens system because of bad field curvature. On the other hand, the desired effect of concept (a) may be lost and result in an undesirable field curvature and coma if the lower limit is broken.

Condition (2), which defines the refractive power of the airspace $D_4$ formed between surfaces $R_4$ and $R_5$, relates to the above concept (b). The correction of coma will be difficult outside the range of condition (2). Further, astigmatism will be difficult to be corrected if the lower limit is broken.

The additional condition (3) is a fundamental condition concerning the refractive index for the correction of coma and astigmatism. If $N_C$ is selected without fulfilling condition (3), it will be difficult to correct coma and astigmatism regardless of the selection of the refractive indices with respect to the positive lenses. Further, this situation is unfavorable to the correction of the field cuvature.

All of the five lenses, $L_1$ to $L_5$ of the present invention may each consist of a single lens element as shown in FIG. 1. Alternatively, it may be possible for the first to third and fifth lenses, $L_1$, $L_2$, $L_3$ and $L_5$ to be respectively single lenses and the fourth lens $L_4$, a doublet constructed of a positive single lens element and a negative single lens element cemented to the positive single lens element at the image side thereof as shown in FIG. 2.

In the second case of FIG. 2, the lens system of the present invention further fulfills the following conditions to be an extremely high speed lens system reaching F 2.0 with a compact size:

$$0.3 < \nu_B - \nu_A < 4 \tag{4}$$

$$\nu_B < 32 \tag{5}$$

$$-0.5f < R_C < -0.3f \tag{6}$$

wherein;

$\nu_A$ represents an Abbe number of the positive single lens element in the doublet $L_4$;

$\nu_B$ represents an Abbe number of the negative single lens element in the doublet $L_4$; and $R_C$ represents a radius of curvature of the cementing surface $R_8$ in the doublet $L_4$.

In a telephoto lens system, the spherical aberration of light in the shorter wavelength range, e.g., a light of g-line, tends to be undesirably over-corrected if the system is designed to have a large aperture ratio. The above conditions (4) and (6) are provided to correct any spherical aberration of the shorter wavelength light.

If the upper limit of condition (4) or (6) is broken, it may be difficult to correct the chromatic aberration. On the other hand, the over-correction of spherical aberration of shorter wavelength light should not be improved if the lower limit of condition (4) or (6) is broken.

Condition (5) is for correcting chromatic aberration, and both the lateral and longitudinal chromatic aberrations may be difficult to be corrected in any case where condition (5) is not fulfilled.

The graphical plots of spherical aberration, astigmatism and distortion disclosed in FIGS. 3 to 6 refer specifically to the first through fourth embodiments. The following Tables 1 to 4 show the first to fourth embodiments of the present invention, respectively. The first and second embodiments correspond to FIG. 1 and the third and fourth embodiments to FIG. 2.

Table 1

Embodiment 1
$f = 100$  $1 : 2.8$  Field Angle $2\omega = 18°$

| Radius of Curvature | | Axial Distance | | Refractive Index | | Abbe Number | |
|---|---|---|---|---|---|---|---|
| $R_1$ | 40.68 | | | | | | |
| | | $D_1$ | 5.2 | $N_1$ | 1.6073 | $\nu_1$ | 59.5 |
| $R_2$ | 453.8 | | | | | | |
| | | $D_2$ | 0.23 | | | | |
| $R_3$ | 33.59 | | | | | | |
| | | $D_3$ | 5.2 | $N_2$ | 1.67 | $\nu_2$ | 57.1 |
| $R_4$ | 79.52 | | | | | | |
| | | $D_4$ | 1.7 | | | | |
| $R_5$ | 188.42 | | | | | | |
| | | $D_5$ | 4.3 | $N_3$ | 1.6727 | $\nu_3$ | 32.2 |
| $R_6$ | 103.0 | | | | | | |
| | | $D_6$ | 2.8 | | | | |
| $R_7$ | 113.9 | | | | | | |
| | | $D_7$ | 5.5 | $N_4$ | 1.7552 | $\nu_4$ | 27.5 |
| $R_8$ | 20.18 | | | | | | |
| | | $D_8$ | 24.3 | | | | |
| $R_9$ | 65.15 | | | | | | |
| | | $D_9$ | 1.8 | $N_5$ | 1.8052 | $\nu_5$ | 25.4 |
| $R_{10}$ | 211.9 | | | | | | |

Table 2

Embodiment 2
$f = 100$  $1 : 2.8$  Field Angle $2\omega = 18°$

| Radius of Curvature | | Axial Distance | | Refractive Index | | Abbe Number | |
|---|---|---|---|---|---|---|---|
| $R_1$ | 41.47 | | | | | | |
| | | $D_1$ | 5.2 | $N_1$ | 1.6204 | $\nu_1$ | 60.3 |
| $R_2$ | 390.1 | | | | | | |
| | | $D_2$ | 0.34 | | | | |
| $R_3$ | 33.88 | | | | | | |
| | | $D_3$ | 5.3 | $N_2$ | 1.67 | $\nu_2$ | 57.1 |
| $R_4$ | 78.93 | | | | | | |
| | | $D_4$ | 1.8 | | | | |
| $R_5$ | 180.2 | | | | | | |
| | | $D_5$ | 4.3 | $N_3$ | 1.683 | $\nu_3$ | 32.1 |
| $R_6$ | 101.8 | | | | | | |
| | | $D_6$ | 2.9 | | | | |
| $R_7$ | 110.8 | | | | | | |
| | | $D_7$ | 5.5 | $N_4$ | 1.7552 | $\nu_4$ | 27.5 |
| $R_8$ | 20.31 | | | | | | |
| | | $D_8$ | 24.3 | | | | |
| $R_9$ | 62.96 | | | | | | |
| | | $D_9$ | 1.8 | $N_5$ | 1.8052 | $\nu_5$ | 25.4 |
| $R_{10}$ | 196.4 | | | | | | |

Table 3

Embodiment 3
$f = 100$  $1 : 2.0$  Field Angle $2\omega = 18°$

| Radius of Curvature | | Axial Distance | | Refractive Index | | Abbe Number | |
|---|---|---|---|---|---|---|---|
| $R_1$ | 52.03 | | | | | | |
| | | $D_1$ | 9.0 | $N_1$ | 1.67 | $\nu_1$ | 57.1 |
| $R_2$ | 528.4 | | | | | | |
| | | $D_2$ | 0.26 | | | | |
| $R_3$ | 41.09 | | | | | | |
| | | $D_3$ | 8.0 | $N_2$ | 1.713 | $\nu_2$ | 53.9 |
| $R_4$ | 182.1 | | | | | | |
| | | $D_4$ | 1.8 | | | | |
| $R_5$ | 398.8 | | | | | | |
| | | $D_5$ | 5.0 | $N_3$ | 1.7552 | $\nu_3$ | 27.5 |
| $R_6$ | 86.47 | | | | | | |
| | | $D_6$ | 2.4 | | | | |
| $R_7$ | 170.9 | | | | | | |
| | | $D_7$ | 6.3 | $N_4$ | 1.7552 | $\nu_4$ | 27.5 |
| $R_8$ | −44.48 | | | | | | |
| | | $D_8$ | 1.7 | $N_5$ | 1.733 | $\nu_5$ | 28.2 |
| $R_9$ | 22.96 | | | | | | |
| | | $D_9$ | 29.9 | | | | |
| $R_{10}$ | 58.39 | | | | | | |
| | | $D_{10}$ | 2.1 | $N_6$ | 1.8074 | $\nu_6$ | 31.6 |
| $R_{11}$ | 250.3 | | | | | | |

Table 4

Embodiment 4
$f = 100$  $1 : 2.0$  Field Angle $2\omega = 18°$

| Radius of Curvature | | Axial Distance | | Refractive Index | | Abbe Number | |
|---|---|---|---|---|---|---|---|
| $R_1$ | 50.73 | | | | | | |
| | | $D_1$ | 10.7 | $N_1$ | 1.67 | $\nu_1$ | 57.1 |
| $R_2$ | 713.9 | | | | | | |
| | | $D_2$ | 0.13 | | | | |
| $R_3$ | 41.72 | | | | | | |
| | | $D_3$ | 7.6 | $N_2$ | 1.72 | $\nu_2$ | 52.1 |
| $R_4$ | 244.1 | | | | | | |
| | | $D_4$ | 1.4 | | | | |
| $R_5$ | 632.1 | | | | | | |
| | | $D_5$ | 5.3 | $N_3$ | 1.7174 | $\nu_3$ | 29.4 |
| $R_6$ | 76.49 | | | | | | |
| | | $D_6$ | 2.4 | | | | |
| $R_7$ | 224.8 | | | | | | |
| | | $D_7$ | 6.1 | $N_4$ | 1.7552 | $\nu_4$ | 27.5 |
| $R_8$ | −41.73 | | | | | | |
| | | $D_8$ | 1.9 | $N_5$ | 1.74 | $\nu_5$ | 28.3 |
| $R_9$ | 23.43 | | | | | | |
| | | $D_9$ | 30.3 | | | | |
| $R_{10}$ | 59.47 | | | | | | |
| | | $D_{10}$ | 2.2 | $N_6$ | 1.8074 | $\nu_6$ | 31.6 |
| $R_{11}$ | 354.2 | | | | | | |

As can be readily appreciated, it is possible to deviate from the above embodiments of the present invention and as will be readily understood by those skilled in the art, the invention is capable of many modifications and improvements within the scope and spirit thereof. Accordingly, it will be understood that the invention is not to be limited by the specific disclosed embodiments but only by the scope and spirit of the appended claims.

What is claimed is:

1. An improved compact high speed telephoto lens system comprising, from the object to the image side of the lens system;
   a first lens of a positive meniscus shape, convex to the object side;
   a second lens of a positive meniscus shape, convex to the object side;
   a third lens of a negative meniscus shape, convex to the object side, the second and third lenses are positioned to form therebetween an air space of a negative refractive power;

a fourth lens of a negative meniscus shape, convex to the object side, and a fifth lens of a positive refractive power wherein the lens system fulfills the following conditions:

$0.2 < D_B/D_A < 0.45$ $-0.8/f < 1.0 - N_A/R_A + N_B \cdot 1.0/R_B < -0.1/f$ $N_C > 1.7$ wherein:
- $D_A$ represents a sum of the axial distance from the object side surface of the first lens to the image side surface of the fourth lens;
- $D_B$ represents a sum of the axial distances from the image side surface of the third lens to the image side surface of the fourth lens;
- $R_A$ represents a radius of curvature of the image side surface of the second lens;
- $R_B$ represents a radius of curvature of the object side surface of the third lens;
- $N_A$ represents a refractive index of a glass material forming the image side surface of the second lens;
- $N_B$ represents a refractive index of a glass material forming the object side surface of the third lens;
- $N_C$ represents a refractive index of a glass material forming the image side surface of the four lens; and
- f represents the focal length of the whole lens system.

2. The invention of claim 1 wherein the aperture ratio is at least 1/2.8 with a field angle of approximately 18°.

3. The invention of claim 1, wherein all of the first to fifth lenses each consist of a single lens element.

4. The invention of claim 1, wherein each of the first to third and the fifth lenses consists of a single lens element while the fourth lens consists of a doublet constructed of a positive single lens element and a negative single lens element cemented to the positive single lens element at the image side thereof.

5. The invention of claim 4, wherein the lens system further fulfills the following conditions:

$0.3 < \nu_B - \nu_A < 4$ $\nu_B < 32$ $-0.5f < R_C < -0.3f$ wherein:
- $\nu_A$ represents an Abbe number of the positive single lens element in the doublet;
- $\nu_B$ represents an Abbe number of the negative single lens element in the doublet; and
- $R_C$ represents a radius of curvature of the cementing surface in the doublet.

6. A compact high speed telephoto lens system comprising the following design parameters;

| f = 100 | | 1 : 2.8 | | Field Angle 2ω = 18° | |
|---|---|---|---|---|---|
| Radius of Curvature | | Axial Distance | Refractive Index | | Abbe Number |
| $R_1$ | 40.68 | | | | |
| | | $D_1$ 5.2 | $N_1$ | 1.6073 | $\nu_1$ 59.5 |
| $R_2$ | 453.8 | | | | |
| | | $D_2$ 0.23 | | | |
| $R_3$ | 33.59 | | | | |
| | | $D_3$ 5.2 | $N_2$ | 1.67 | $\nu_2$ 57.1 |
| $R_4$ | 79.52 | | | | |
| | | $D_4$ 1.7 | | | |
| $R_5$ | 188.42 | | | | |
| | | $D_5$ 4.3 | $N_3$ | 1.6727 | $\nu_3$ 32.2 |
| $R_6$ | 103.0 | | | | |
| | | $D_6$ 2.8 | | | |
| $R_7$ | 113.9 | | | | |
| | | $D_7$ 5.5 | $N_4$ | 1.7552 | $\nu_4$ 27.5 |
| $R_8$ | 20.18 | | | | |
| | | $D_8$ 24.3 | | | |
| $R_9$ | 65.15 | | | | |
| | | $D_9$ 1.8 | $N_5$ | 1.8052 | $\nu_5$ 25.4 |
| $R_{10}$ | 211.9 | | | | |

7. A compact high speed telephoto lens system comprising the following design parameters;

| f = 100 | | 1 : 2.0 | | Field Angle 2ω = 18° | |
|---|---|---|---|---|---|
| Radius of Curvature | | Axial Distance | Refractive Index | | Abbe Number |
| $R_1$ | 52.03 | | | | |
| | | $D_1$ 9.0 | $N_1$ | 1.67 | $\nu_1$ 57.1 |
| $R_2$ | 528.4 | | | | |
| | | $D_2$ 0.26 | | | |
| $R_3$ | 41.09 | | | | |
| | | $D_3$ 8.0 | $N_2$ | 1.713 | $\nu_2$ 53.9 |
| $R_4$ | 182.1 | | | | |
| | | $D_4$ 1.8 | | | |
| $R_5$ | 398.8 | | | | |
| | | $D_5$ 5.0 | $N_3$ | 1.7552 | $\nu_3$ 27.5 |
| $R_6$ | 86.47 | | | | |
| | | $D_6$ 2.4 | | | |
| $R_7$ | 170.9 | | | | |
| | | $D_7$ 6.3 | $N_4$ | 1.7552 | $\nu_4$ 27.5 |
| $R_8$ | −44.48 | | | | |
| | | $D_8$ 1.7 | $N_5$ | 1.733 | $\nu_5$ 28.2 |
| $R_9$ | 22.96 | | | | |
| | | $D_9$ 29.9 | | | |
| $R_{10}$ | 58.39 | | | | |
| | | $D_{10}$ 2.1 | $N_6$ | 1.8074 | $\nu_6$ 31.6 |
| $R_{11}$ | 250.3 | | | | |

* * * * *